US012587392B2

(12) United States Patent
Hu et al.

(10) Patent No.: US 12,587,392 B2
(45) Date of Patent: Mar. 24, 2026

(54) SECURE COMMUNICATION METHOD AND APPARATUS IN PASSIVE OPTICAL NETWORK

(71) Applicant: HUAWEI TECHNOLOGIES CO., LTD., Shenzhen (CN)

(72) Inventors: Yongfeng Hu, Dongguan (CN); Wenbin Ouyang, Dongguan (CN); Gang Zheng, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 180 days.

(21) Appl. No.: 18/124,194

(22) Filed: Mar. 21, 2023

(65) Prior Publication Data

US 2023/0231728 A1    Jul. 20, 2023

Related U.S. Application Data

(63) Continuation of application No. PCT/CN2021/118085, filed on Sep. 14, 2021.

(30) Foreign Application Priority Data

Sep. 22, 2020    (CN) .......................... 202011002853.0

(51) Int. Cl.
| | |
|---|---|
| *H04L 9/32* | (2006.01) |
| *H04B 10/27* | (2013.01) |
| *H04L 9/08* | (2006.01) |

(52) U.S. Cl.
CPC ........... *H04L 9/3268* (2013.01); *H04B 10/27* (2013.01); *H04L 9/085* (2013.01)

(58) Field of Classification Search
CPC ..... H04L 9/3268; H04L 9/085; H04L 9/0841; H04L 9/14; H04L 9/3247; H04L 9/3263;
(Continued)

(56) References Cited

U.S. PATENT DOCUMENTS

| | | | | |
|---|---|---|---|---|
| 2006/0129814 A1* | 6/2006 | Eun | ......................... | H04L 63/08 |
| | | | | 713/168 |
| 2008/0037986 A1* | 2/2008 | Effenberger | ........ | H04J 14/0247 |
| | | | | 398/58 |

(Continued)

FOREIGN PATENT DOCUMENTS

| | | | |
|---|---|---|---|
| CN | 101064599 A | * | 10/2007 |
| CN | 101068145 A | * | 11/2007 |

(Continued)

OTHER PUBLICATIONS

Marco Baldi, "Code-based physical layer secret key generation in passive optical networks", Ad Hoc Networks vol. 89, Jun. 1, 2019, pp. 1-8 , https://doi.org/10.1016/j.adhoc.2019.02.003 (Year: 2019).*

(Continued)

*Primary Examiner* — Shahriar Zarrineh
(74) *Attorney, Agent, or Firm* — Fish & Richardson P.C.

(57) ABSTRACT

The present disclosure provides methods for secure communication. In an example method, an optical line terminal (OLT) sends a first message to an optical network unit (ONU), where the first message includes a first key algorithm, a certificate of the OLT, and a public key of the OLT, and the first key algorithm is a key algorithm supported by both the OLT and the ONU. The ONU verifies the certificate of the OLT, and after the verification succeeds, the ONU determines a shared key based on the first key algorithm and the public key of the OLT. The ONU sends a second message to the OLT, where the second message includes a certificate of the ONU and a public key of the ONU. The OLT verifies the certificate of the ONU. After the verification succeeds, the OLT determines the shared key based on the first key algorithm and the public key of the ONU.

20 Claims, 2 Drawing Sheets

(58) Field of Classification Search
CPC ... H04L 9/40; H04L 63/0435; H04L 63/0823;
H04L 63/123; H04B 10/27; H04B 10/85;
H04B 10/272; H04Q 11/00
See application file for complete search history.

(56) References Cited

U.S. PATENT DOCUMENTS

| | | | | |
|---|---|---|---|---|
| 2009/0161557 A1* | 6/2009 | Macias | ............... | H04L 41/0681 |
| | | | | 370/242 |
| 2009/0228696 A1* | 9/2009 | Mckelvey | ............... | H04L 69/40 |
| | | | | 713/2 |
| 2010/0272259 A1* | 10/2010 | Kim | .................... | H04L 63/0236 |
| | | | | 380/282 |
| 2011/0029773 A1* | 2/2011 | Effenberger | ....... | H04Q 11/0067 |
| | | | | 713/168 |
| 2012/0128155 A1* | 5/2012 | Effenberger | .......... | H04L 9/0822 |
| | | | | 380/256 |
| 2014/0052991 A1* | 2/2014 | Effenberger | ....... | H04Q 11/0067 |
| | | | | 726/1 |
| 2014/0304500 A1* | 10/2014 | Sun | ....................... | H04L 63/061 |
| | | | | 713/153 |
| 2015/0156014 A1* | 6/2015 | Shaffer | ................. | H04L 63/061 |
| | | | | 380/256 |
| 2019/0036909 A1* | 1/2019 | Goeringer | ............. | G06F 21/606 |
| 2019/0165941 A1* | 5/2019 | Ray | ....................... | H04L 9/3265 |
| 2020/0106618 A1* | 4/2020 | Osborn | ..................... | H04L 9/14 |

FOREIGN PATENT DOCUMENTS

| | | | | | | |
|---|---|---|---|---|---|---|
| CN | 101662705 A | * | 3/2010 | | | |
| CN | 102239661 A | * | 11/2011 | | .......... | H04L 9/0844 |
| CN | 102246487 A | | 11/2011 | | | |
| CN | 103905209 A | | 7/2014 | | | |
| CN | 105027482 A | * | 11/2015 | | ........... | H04L 9/0891 |
| CN | 108306853 A | * | 7/2018 | | ......... | H04L 63/0442 |
| CN | 109120419 A | * | 1/2019 | | .......... | H04L 41/082 |
| CN | 109274489 A | * | 1/2019 | | ............ | H04L 9/002 |
| CN | 112889228 A | * | 6/2021 | | ......... | H04Q 11/0067 |
| CN | 113169953 A | * | 7/2021 | | .......... | H04L 9/3268 |
| EP | 2091176 A1 | * | 8/2009 | | .......... | H04L 9/0822 |
| EP | 4539385 A1 | * | 4/2025 | | ............ | H04L 9/002 |
| KR | 20030088643 A | * | 11/2003 | | | |
| KR | 20060065863 A | * | 6/2006 | | | |
| KR | 100594023 B1 | * | 7/2006 | | ......... | H04Q 11/0067 |
| KR | 20070059884 A | * | 6/2007 | | | |
| WO | WO-2011017847 A1 | * | 2/2011 | | .......... | H04L 9/0844 |
| WO | WO-2011017848 A1 | * | 2/2011 | | .......... | H04L 9/0866 |
| WO | WO-2012100552 A1 | * | 8/2012 | | .......... | H04L 9/0866 |
| WO | WO-2013104987 A1 | * | 7/2013 | | ............ | H04L 63/08 |

OTHER PUBLICATIONS

Aihan Yin, Xin Guo, "10 Gbit/s ethernet passive optical network certification scheme based on number theory research unit signature algorithm", Optical Engineering, vol. 57, Issue 6, 066108 (Jun. 2018). https://doi.org/10.1117/1.OE.57.6.066108, 6 pages (Year: 2018).*

Aihan Yin, "An efficient and secure authentication scheme based on NTRU for 10G ethernet passive optical", Optik vol. 125, Issue 24, Dec. 2014, pp. 7207-7210, https://doi.org/10.1016/j.ijleo.2014.07.135 (Year: 2014).*

International Search Report and Written Opinion in International Appln. No. PCT/CN2021/118085, mailed on Nov. 25, 2021, 16 pages (with English translation).

* cited by examiner

SECURE COMMUNICATION METHOD AND APPARATUS IN PASSIVE OPTICAL NETWORK

CROSS-REFERENCE TO RELATED APPLICATIONS

This application is a continuation of International Application No. PCT/CN2021/118085, filed on Sep. 14, 2021, which claims priority to Chinese Patent Application No. 202011002853.0, filed on Sep. 22, 2020. The disclosures of the aforementioned applications are hereby incorporated by reference in their entireties.

TECHNICAL FIELD

This application relates to the field of optical communication, and more specifically, to a secure communication method and an apparatus in a passive optical network (Passive Optical Network, PON).

BACKGROUND

A passive optical network (Passive Optical Network, PON) technology is a point-to-multipoint fiber access technology. A PON system may include an optical line terminal (Optical Line Terminal, OLT), an optical distribution network (Optical Distribution Network, ODN), and at least one optical network unit (Optical Network Unit, ONU). The OLT is connected to a plurality of ONUs through the ODN.

To ensure communication security, the OLT needs to perform security authentication on the ONU. At present, common authentication methods mainly include authentication that is based on an ONU serial number (serial number, SN), authentication that is based on an ONU media access control (Media Access Control, MAC) address, authentication that is based on a password, and the like. Based on the foregoing authentication methods, the OLT can authenticate validity of the ONU. However, because in the foregoing authentication methods, information such as the SN and the password is transmitted in plaintext, a leakage risk exists. In addition, because these methods are all one-way authentication, the ONU cannot authenticate the OLT. If a spoofing OLT configures and controls the ONU, a service of a terminal user is greatly affected, and a great security risk exists.

Therefore, a PON system secure communication method with higher security is urgently needed.

SUMMARY

This application provides a secure communication method in a PON system, and an apparatus and a system for implementing the method.

According to a first aspect, this application provides a secure communication method in a PON system. First, an OLT sends a first message to an ONU, where the first message includes a first key algorithm, a certificate of the OLT, and a public key of the OLT. The first key algorithm is a key algorithm supported by both the OLT and the ONU. The ONU verifies the certificate of the OLT. After the verification succeeds, the ONU determines a shared key based on the first key algorithm and the public key of the OLT. Then, the ONU sends a second message to the OLT, where the second message includes a certificate of the ONU and a public key of the ONU. After receiving the second message, the OLT verifies the certificate of the ONU. After the verification succeeds, the OLT determines the shared key based on the first key algorithm and the public key of the ONU. It should be noted that based on the first key algorithm, the shared key determined by the ONU is the same as the shared key determined by the OLT. In this way, the ONU and the OLT may use the shared key to perform encrypted communication on a message and data of a session or communication.

According to the method in the first aspect, the OLT authenticates the ON U, and the ONU can also authenticate validity of the OLT. Two-way authentication between the OLT and the ONU is implemented without introducing another device or entity, to improve system security, and reduce operation and maintenance difficulty. In addition, after the authentication is completed, the shared key is further agreed on. Communication between the OLT and the ONU is encrypted for protection by using the shared key, to enhance data security protection and improve a communication security level.

In a possible implementation of the first aspect, the OLT may obtain a key algorithm supported by the ONU from the ON U. For example, the OLT first sends an authentication request to the ONU, the ONU sends, to the OLT, a third message that includes the key algorithm supported by the ONU, and the OLT further determines the first key algorithm based on the key algorithm supported by the ONU and a key algorithm supported by the OLT. In this implementation, the key algorithm supported by the ONU does not need to be configured on the OLT in advance, thereby reducing operation and maintenance costs.

In a possible implementation of the first aspect, the first message further includes a key parameter set, where the key parameter set includes one or more key parameters. The OLT transmits, to the ONU by using a message, a key parameter used by the OLT. In a process of calculating and generating a key, the ONU and the OLT use a same parameter, to ensure consistency of the shared keys finally obtained through calculation by the ONU and the OLT.

In a possible implementation of the first aspect, the OLT uses a random number as a private key of the OLT, and the OLT determines the public key of the OLT based on the first key algorithm, a first key parameter, and the private key of the OLT, where the first key parameter is one or more key parameters in the key parameter set. The ONU uses a random number as a private key of the ONU, and the ONU determines the public key of the ONU based on the first key algorithm, the first key parameter, and the private key of the ONU.

In a possible implementation of the first aspect, the ONU determines the shared key based on the first key algorithm, a second key parameter, the public key of the OLT, and a private key of the ONU, where the second key parameter is one or more key parameters in the key parameter set; and the OLT determines the shared key based on the first key algorithm, the second key parameter, the public key of the ONU, and a private key of the OLT.

As described above, the OLT and the ONU use the same key algorithm and key parameter during calculation. The OLT and the ONU exchange public information without using a secure channel, and agree on a key that is known only to each other. In an entire process, a third-party device or network element does not need to participate, and a secure channel does not need to be agreed on and established in advance. This improves security of communication between the OLT and the ONU, and further reduces implementation difficulty and costs compared with a conventional technology.

In a possible implementation of the first aspect, to further improve security, the OLT may further use a private key corresponding to the certificate of the OLT to digitally sign the first message; and correspondingly, the ONU uses a private key corresponding to the certificate of the ONU to digitally sign the second message.

In a possible implementation of the first aspect, the OLT initiates the authentication request to the ONU after receiving a registration message of the ONU.

In a possible implementation of the first aspect, the foregoing messages related to security authentication of the OLT and the ONU, such as the first message, the second message, the third message, and the authentication request, are transmitted through optical network terminal management and control interface (optical network terminal management and control interface, OMCI) messages. For example, the authentication message and the first message are implemented through OMCI set SET message; and the second message and the third message are implemented through OMCI attribute value change (Attribute Value Change, AVC) messages. For another example, new OMCI message types may be further added, and respectively correspond to the first message, the second message, the third message, and the authentication request.

According to a second aspect, this application provides a device in a PON system. The device includes a processor, a memory, and a transceiver. The transceiver is configured to receive and send a signal and data. The memory is configured to store program instructions. The processor is configured to execute a program stored in the memory. When the program is executed, the device performs a method related to the OLT or the ONU in the first aspect.

According to a third aspect, this application provides a PON secure communication system. The PON system includes the OLT and the ONU described in the foregoing aspects.

According to a fourth aspect, this application provides a computer-readable storage medium. The computer-readable storage medium stores a computer program. When the computer program is executed by hardware, a part or all of steps related to the OLT or the ONU in the first aspect can be implemented.

DESCRIPTION OF EMBODIMENTS

The following describes technical solutions in embodiments of this application with reference to the accompanying drawings in embodiments of this application.

The technical solutions in embodiments of this application may be applied to various passive optical network systems, for example, a next-generation PON (next-generation PON, NG-PON), an NG-PON 1, an NG-PON 2, a gigabit-capable PON (gigabit-capable PON, GPON), a 10 gigabit per second PON (10 gigabit per second PON, XG-PON), a 10-gigabit-capable symmetric passive optical network (10-gigabit-capable symmetric passive optical network, XGS-PON), an Ethernet PON (Ethernet PON, EPON), a 10 gigabit per second EPON (10 gigabit per second EPON, 10G-EPON), a next-generation EPON (next-generation EPON, NG-EPON), a wavelength-division multiplexing (wavelength-division multiplexing, WDM) PON, a time wavelength division multiplexing (time wavelength division multiplexing, TWDM) PON, a point-to-point (point-to-point, P2P) WDM PON (P2P-WDM PON), an asynchronous transfer mode PON (asynchronous transfer mode PON, APON), a broadband PON (broadband PON, BPON), a 25 gigabit per second PON (25 gigabit per second PON, 25G-PON), a 50 gigabit per second PON (50 gigabit per second PON, 50G-PON), a 100 gigabit per second PON (100 gigabit per second PON, 100G-PON), a 25 gigabit per second EPON (25 gigabit per second EPON, 25G-EPON), a 50 gigabit per second EPON (50 gigabit per second EPON, 50G-EPON), a 100 gigabit per second EPON (100 gigabit per second EPON, 100G-EPON), and a GPON or an EPON with another rate.

Figure 1:
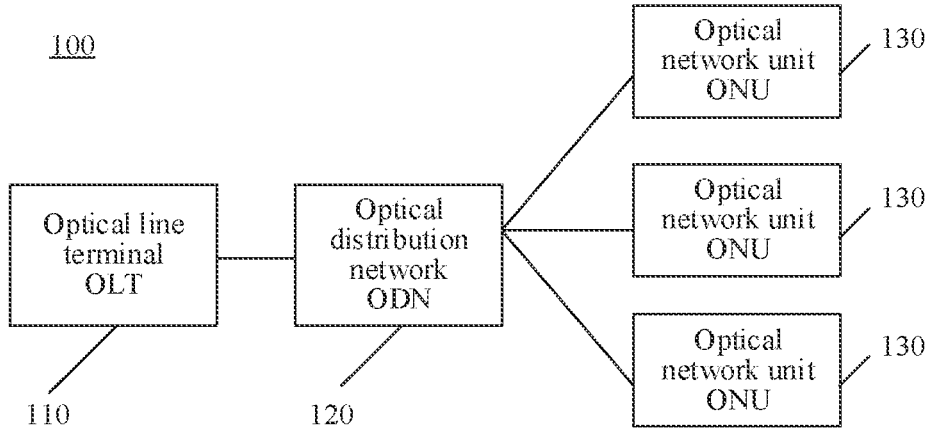
FIG. 1 is a schematic architectural diagram of a PON system according to an embodiment of this application.

FIG. 1 is a schematic architectural diagram of a PON system 100 applicable to embodiments of the present invention. As shown in FIG. 1, the PON system 100 includes at least one OLT 110, at least one ODN 120, and a plurality of ONUs 130. The OLT 110 provides a network-side interface for the PON system 100, and the ONU 130 provides a user-side interface for the PON system 100, and is connected to the ODN 120. If the ONU 130 directly provides a user interface function, the ONU 130 is referred to as an optical network terminal (Optical Network Terminal, ONT). For ease of description, the ONUs 130 mentioned below collectively refer to the ONT that can directly provide the user interface function and the ONU that can provide the user-side interface. The ODN 120 is a network including an optical fiber and a passive optical splitter, and is configured to connect the OLT 110 device and the ONU 130 device to distribute or multiplex a data signal between the OLT 110 and the ONU 130.

In the PON system 100, a direction from the OLT 110 to the ONU 130 is defined as a downstream direction, and a direction from the ONU 130 to the OLT 110 is defined as an upstream direction. In the downstream direction, the OLT 110 broadcasts downstream data in a time division multiplexing (Time Division Multiplexing, TDM) mode to a plurality of ONUs 130 managed by the OLT 110, and each ONU 130 receives only data that carries an identifier of the ONU 130. In the upstream direction, the plurality of ONUs 130 communicate with the OLT 110 in a time division multiple access (Time Division Multiple Access, TDMA) mode, and each ONU 130 sends upstream data by using a time domain resource allocated by the OLT 110 to the ONU 130. By using the foregoing mechanism, a downstream optical signal sent by the OLT 110 is a continuous optical signal, and an upstream optical signal sent by the ONU 130 is a burst optical signal.

The OLT 110 is usually located in a central office (Central Office, CO), and may centrally manage at least one ONU 130, and transmit data between the ONU 130 and an upper-layer network. To be specific, the OLT 110 may serve as a medium between the ONU 130 and the upper-layer network (for example, the internet or a public switched telephone network (Public Switched Telephone Network, PSTN)), to forward data received from the upper-layer network to the ONU 130 and forward data received from the ONU 130 to the upper-layer network. A specific structure configuration of the OLT 110 may vary with a specific type of the PON system 100. For example, in an embodiment, the OLT 110 may include a transmitter and a receiver. The transmitter is configured to send a continuous downstream optical signal to the ONU 130, and the receiver is configured to receive a burst upstream optical signal from the ONU 130. The downstream optical signal and the upstream optical signal may be transmitted through the ODN 120. However, this is not limited in this embodiment of the present invention.

The ONU 130 may be disposed at a user-side position (such as a customer premise) in a distributed manner. The ONU 130 may be a network device configured for communication between the OLT 110 and a user. To be specific, the ONU 130 may serve as a medium between the OLT 110 and a user. For example, the ONU 130 may forward data received from the OLT 110 to the user, and forward data received from the user to the OLT 110.

The ODN 120 may be a data distribution network, and may include an optical fiber, an optical coupler, an optical splitter, or another device. In an embodiment, the optical fiber, the optical coupler, the optical splitter, or the another device may be a passive optical component. To be specific, the optical fiber, the optical coupler, the optical splitter, or the another device may be a component that performs data signal distribution between the OLT 110 and the ONU 130 without a need of power support. To be specific, an optical splitter (Splitter) is used as an example. The optical splitter may be connected to the OLT 110 through a backbone optical fiber, and connected to the plurality of ONUs 130 respectively through a plurality of branch optical fibers, thereby implementing a point-to-multipoint connection between the OLT 110 and the ONU 130. In addition, in another embodiment, the ODN 120 may further include one or more processing devices, for example, an optical amplifier or a relay device (Relay device). In addition, the ODN 120 may be specifically extended from the OLT 110 to the plurality of ONUs 130, or may be configured in any other point-to-multipoint structure. This is not limited in this embodiment of the present invention.

In a PON system, a typical security threat is that an invalid ONU is disguised as a valid ONU to receive and send data, which occupies a large amount of bandwidth and wastes a network resource. As a result, a common user cannot perform registration; or an invalid ONU is disguised as a successfully registered ONU to steal important information of a user. In addition, the OLT is an important central office device in the PON system, and the OLT is responsible for operations such as control and management of an ONU device. If an attacker is disguised as the OLT and controls a large quantity of ONUs that are connected to and managed by the OLT, a great security threat is caused to a terminal user.

The following describes, based on the PON system 100 shown in FIG. 1 and with reference to specific embodiments, a secure communication method and an apparatus provided in this application.

Figure 2:
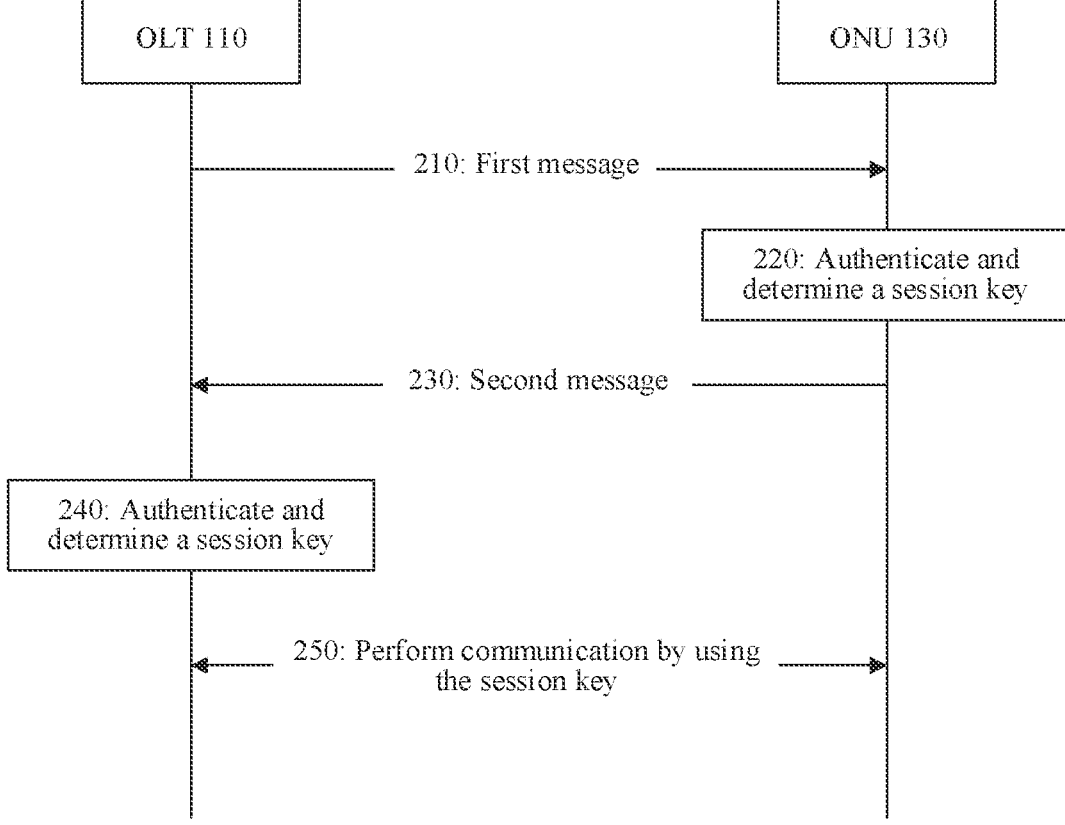
FIG. 2 is a schematic diagram of a secure communication method in a PON system according to an embodiment of this application.

FIG. 2 is a flowchart of a secure communication method according to this application.

210: An OLT sends a first message to an ONU, where the first message includes a first key algorithm, a certificate of the OLT, and a public key of the OLT.

The first key algorithm may be information preset on the OLT, or may be selected and determined by the OLT based on an algorithm capability of the OLT and an algorithm capability of the ONU. For example, before performing this step, the OLT first obtains an algorithm supported by the ONU, for example, one or more algorithms such as a key algorithm, a hash algorithm, and a signature algorithm. The OLT may obtain the algorithm supported by the ONU in a plurality of manners. For example, the algorithm supported by the ONU is pre-configured on the OLT, or the OLT initiates an authentication request to the ONU before this step, and the ONU sends the algorithm supported by the ONU to the OLT. The OLT determines, based on an algorithm supported by the OLT and the algorithm supported by the ONU, the first key algorithm, where the first key algorithm is a key algorithm supported by both the OLT and the ONU. The OLT may further determine, based on information obtained from the ONU or configuration information, a hash algorithm, a signature algorithm, and the like that are supported by both the OLT and the ONU.

The certificate of the OLT is preset on an OLT device, or an OLT device applies for a digital certificate from a certificate server in advance. The certificate of the OLT is issued by the certificate server and is used for identity authentication, a digital signature, and the like. It should be noted that a certificate corresponds to a private key and a public key. The certificate includes public key information corresponding to the certificate. The private key of the certificate is stored in a device that holds the certificate. The device may use the private key corresponding to the certificate to sign a sent message, and a receiving end uses the public key corresponding to the certificate to verify the signature.

The public key of the OLT is usually obtained by the OLT through calculation based on the key algorithm. For example, the OLT determines key parameters (p and g) corresponding to the first key algorithm, and generates a random number Ys_a as a private key of the OLT. Then, the private key Ys_a of the OLT and the key parameters (p and g) are used as inputs, and the public key Yc_a of the OLT is obtained through calculation based on the first key algorithm. For example, the OLT obtains the public key Yc_a through calculation according to the following formula:

$$Yc\_a = g^{\char`\^}Ys\_a \bmod p$$

It should be noted that the public key and the private key of the OLT, and the public key and the private key that correspond to the certificate of the OLT are two sets of keys.

In addition, the OLT may further send, through the first message, one or more of the following information, such as a key parameter set used by the OLT, and a hash algorithm and a signature algorithm that are determined by the OLT. To improve security, the OLT may further use the private key corresponding to the certificate of the OLT to digitally sign the first message, to ensure security and integrity of the first message. It should be noted that the OLT signs a message by using the determined hash algorithm and signature algorithm that are supported by both the ONU and the OLT.

220: The ONU determines a shared key based on the first key algorithm and the public key of the OLT after verification on the certificate of the OLT succeeds.

The ONU receives the first message of the OLT, and verifies validity of the certificate of the OLT included in the first message. Verification content includes one or more of the following: whether the certificate of the OLT expires, verifying a secondary certificate of the certificate of the OLT, whether the certificate of the OLT is revoked, and the like. If verification on the certificate of the OLT fails, a failure message is returned to the OLT. Optionally, if the first message includes a digital signature of the OLT, before verifying the certificate of the OLT, the ONU first verifies signature information of the OLT by using the public key included in the certificate of the OLT. If the verification on the signature information fails, a failure message is returned to the OLT. If the verification on the signature information succeeds, the validity of the certificate of the OLT is further verified. It should be noted that the ONU may verify the signature information of the OLT based on pre-configured signature algorithm information or based on signature algorithm information carried in the first message.

The ONU determines the shared key based on the first key algorithm and the public key of the OLT after the verification on the certificate of the OLT succeeds. Specifically, the ONU determines key parameters (p and g) corresponding to the first key algorithm, and generates a random number Ys_b as a private key of the ONU. Then, the ONU uses the private key Ys_b of the ONU and the key parameters (p and g) as inputs, and obtains a public key Yc_b of the ONU through calculation based on the first key algorithm. Then, the ONU uses the key parameter p, the private key Ys_b of the ONU, and the public key Yc_a of the OLT as inputs, and obtains the shared key SK through calculation based on the first key algorithm. For example, the ONU obtains Yc_b and SK through calculation according to the following formulas:

$$Yc\_b = g^{Ys\_b} \bmod p;$$

$$SK = Yc\_a^{Ys\_b} \bmod p$$

The shared key SK is used to perform encryption and security protection for communication between the OLT and the ONU. It should be noted that the ONU may determine, in a plurality of manners, the key parameters (p and g) corresponding to the first key algorithm, for example, based on pre-configured parameters or based on the key parameter set used by the OLT carried in the first message.

230: The ONU sends a second message to the OLT, where the second message includes a certificate of the ONU and a public key of the ONU.

The certificate of the ONU is preset on an ONU device, or an ONU device applies for a digital certificate from the certificate server in advance. The certificate of the ONU is issued by the certificate server and is used for identity authentication, a digital signature, and the like. Similar to the certificate of the OLT, the certificate of the ONU also corresponds to a private key and a public key. The private key and the public key that correspond to the certificate of the ONU, and the private key and the public key of the ONU are two sets of keys.

To improve security, the ONU may further use the private key corresponding to the certificate of the ONU to digitally sign the second message, to ensure security and integrity of the second message. Optionally, the ONU may further include, in the second message, indication information indicating that the ONU has determined the shared key.

240: The OLT determines the shared key based on the first key algorithm and the public key of the ONU after verification on the certificate of the ONU succeeds.

The OLT receives the second message of the ONU, and verifies validity of the certificate of the ONU included in the second message. Verification content includes one or more of the following: whether the certificate of the ONU expires, verifying a secondary certificate of the certificate of the ONU, whether the certificate of the ONU is revoked, and the like. If verification on the certificate of the ONU fails, a failure message is returned to the ONU. Optionally, if the second message includes a digital signature of the ONU, before verifying the certificate of the ONU, the OLT first verifies signature information of the ONU by using the public key included in the certificate of the ONU. If the verification on the signature information fails, a failure message is returned to the ONU. If the verification on the signature information succeeds, the validity of the certificate of the ONU is further verified.

After the verification on the certificate of the ONU succeeds, the OLT determines the shared key based on the first key algorithm and the public key of the ONU. Specifically, the ONU uses the key parameter p, the private key Ys_a of the OLT, and the public key Yc_b of the ONU as inputs, and obtains the shared key SK through calculation based on the first key algorithm. For example, the OLT obtains SK through calculation according to the following formula:

$$SK = Yc\_b^{Ys\_a} \bmod p$$

Based on a modulo operation theorem ($a^b \bmod P = (a \bmod P)^b \bmod P$), it can be proved that the OLT and the ONU may obtain the same shared key through calculation by using the foregoing method.

$$Yc\_b^{Ys\_a} \bmod p$$

$$= (g^{Ys\_b} \bmod p)^{Ys\_a} \bmod p$$

$$= (g^{Ys\_b \cdot Ys\_a}) \bmod p$$

$$= (g^{Ys\_a} \bmod p)^{Ys\_b} \bmod p$$

$$= Yc\_a^{Ys\_b} \bmod p$$

Optionally, after determining the shared key, the OLT may further send a message to the ONU. A message name or message content indicates that the OLT has determined the shared key.

250: The ONU and the OLT use the shared key to encrypt and decrypt communication between the ONU and the OLT.

It can be learned that, in the method shown in FIG. 2, the OLT authenticates the ONU, and the ONU can also authenticate validity of the OLT. Two-way authentication between the OLT and the ONU is implemented without introducing another device or entity, to improve system security, and reduce operation and maintenance difficulty. In addition, after the authentication is completed, the shared key is further agreed on. Communication between the OLT and the ONU is encrypted for protection by using the shared key, to enhance data security protection and improve a communication security level.

Figure 3:
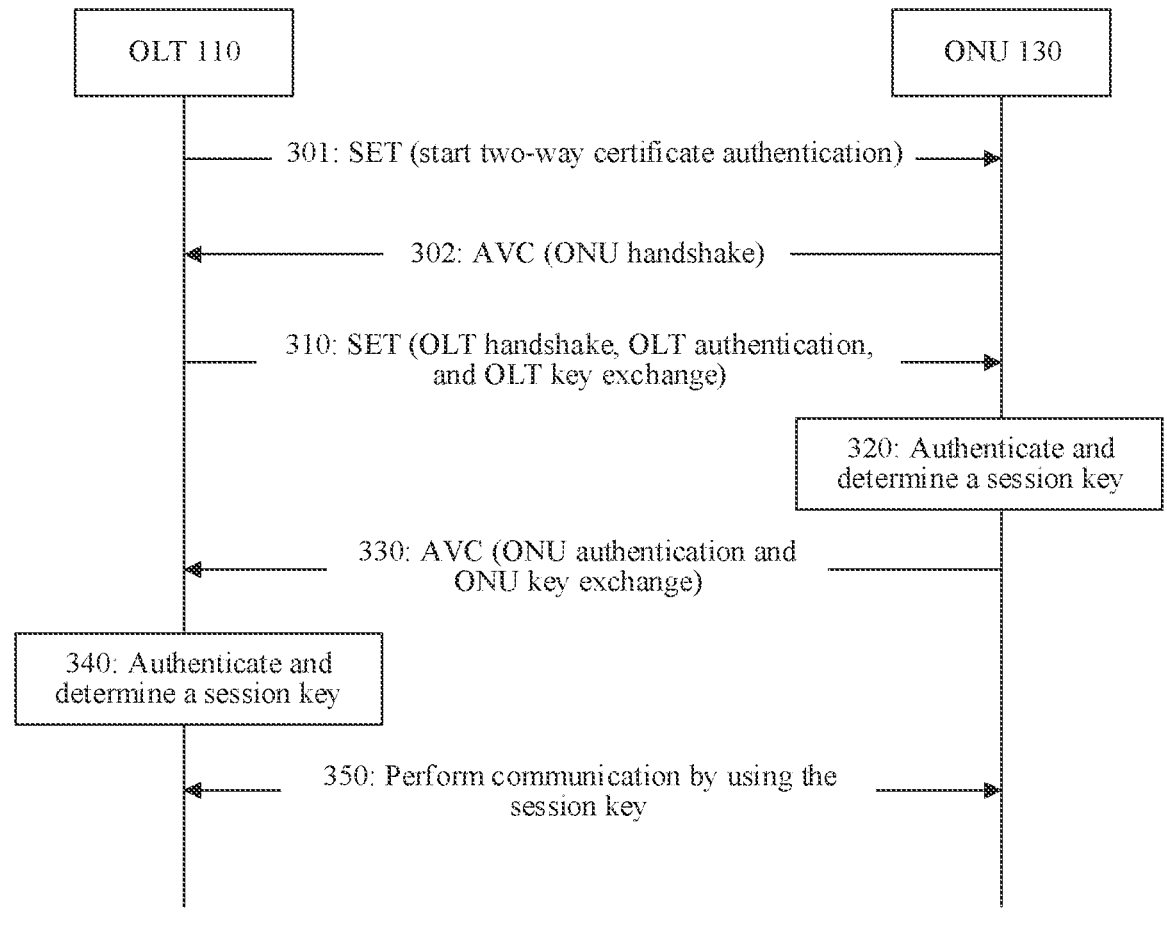
FIG. 3 is a schematic diagram of another secure communication method in a PON system according to an embodiment of this application.

Based on the method concept shown in FIG. 2, FIG. 3 provides an example of implementing the method based on an optical network unit management and control interface in a GPON system. The optical network unit management and control interface (ONU Management and Control Interface, OMCI) is a protocol defined in a GPON standard for information exchange between an OLT and an ONT, and is used for the OLT to manage the ONT in a GPON network, including configuration management, fault management, performance management, security management, and the like.

301: An OLT sends an authentication start request to an ONU. The OLT may send the message after receiving a registration message of the ONU and completing ranging of the ONU. The message may be specifically implemented through a set SET message of an OMCI protocol. The set message carries an OMCI attribute "starting two-way certificate authentication".

302: After receiving the authentication request sent by the OLT, the ONU sends an ONU handshake message to the OLT. The message may be specifically implemented through an OMCI attribute value change AVC message, that is, the AVC message carries an OMCI attribute "ONU handshake". The ONU handshake specifically includes an algorithm supported by the ONU, for example, a key algorithm (such as DH), a signature algorithm (such as RSA), and a hash algorithm (such as SHA256).

310. The message corresponds to the message 210 shown in FIG. 2. Specifically, the message may be implemented through a set SET message of the OMCI protocol. The set message carries OMCI attributes "OLT handshake". "OLT authentication", and "OLT key exchange". The "OLT handshake" includes a first key algorithm determined by the OLT, the "OLT authentication" includes a certificate of the OLT, and the "OLT key exchange" includes a public key of the OLT.

320: For this step, refer to step 220 shown in FIG. 2. Details are not described herein again.

330: The message corresponds to the message 230 shown in FIG. 2. Specifically, the message may be implemented through an attribute value change AVC message of the OMCI protocol. The AVC message carries OMCI attributes "ONU authentication" and "ONU key exchange". The "ONU authentication" includes a certificate of the ONU, and the "ONU key exchange" includes a public key of the ONU.

340: For this step, refer to step 240 shown in FIG. 2. Details are not described herein again.

350: For this step, refer to step 250 shown in FIG. 2. Details are not described herein again.

It should be further noted that, in the OMCI protocol, various resources and services of the ONT managed by the OLT are abstracted into a protocol-independent management information base (protocol-independent Management Information Base). A basic information unit of the management information base is a management entity (manage entity), and the ONT implements a configuration management function of each ME under control of the OLT. Therefore, in this embodiment, an OMCI entity type "authentication security entity" is newly added. In FIG. 3, the OMCI message related to authentication and key agreement carries the "authentication security entity" and a corresponding OMCI attribute. In another embodiment, the method procedure shown in FIG. 2 may alternatively be implemented by newly adding an OMCI message type, for example, newly adding message types such as "ONU authentication", "ONU key exchange", "OLT handshake", "OLT authentication", and "OLT key exchange".

Figure 4:
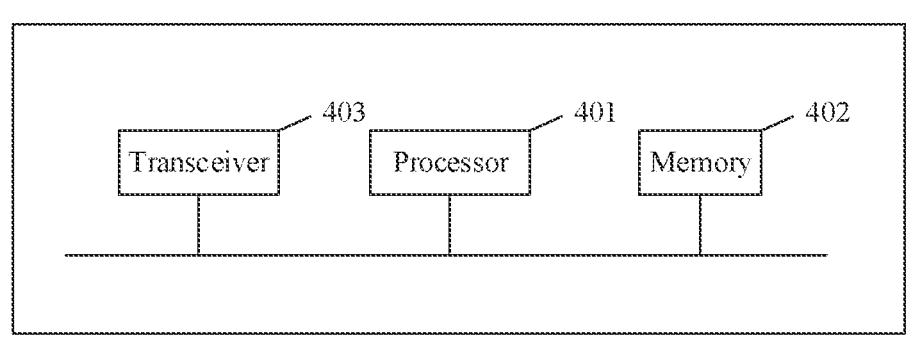
FIG. 4 is a schematic diagram of a structure of an OLT device or an ONU device according to an embodiment of this application.

This application further provides a device 400. The device 400 may be specifically configured to implement a function of an OLT 110 or an ONU 130 in embodiments of this application. As shown in FIG. 4, the device includes a processor 401, a memory 402, and a transceiver 403. The processor 401, the memory 402, and the transceiver 403 are connected to each other by using a line.

The processor 401 may be a general-purpose central processing unit (Central Processing Unit, CPU), a microprocessor, an application-specific integrated circuit ASIC, or at least one integrated circuit, and is configured to execute a related program to implement the technical solutions provided in embodiments of the present invention. The processor may independently have a PON-related protocol medium access control (medium access control, MAC) function, or may implement a PON protocol MAC function through an external chip, to implement communication between the OLT 110 and the ONU 130. The device 400 may include a plurality of processors, and each processor may include one or more CPUs. The processor 401 is specifically responsible for performing a method related to the OLT 110 or the ONU 130 in this application, and communicating with the OLT 110 or the ONU 130 through the transceiver 403.

The memory 402 is configured to store program instructions and data. The memory may be a read-only memory (Read-Only Memory, ROM), a static storage device, a dynamic storage device, or a random access memory (Random Access Memory, RAM). When the technical solutions provided in embodiments of the present invention are implemented by using software or firmware, program code for implementing the technical solutions provided in embodiments of the present invention is stored in the memory 402, and is executed by the processor 401. The memory 402 may be further configured to store and record information such as the algorithm, the parameter, and the key in embodiments of this application.

In an embodiment, the processor 401 may internally include the memory 402. In another embodiment, the processor 401 and the memory 402 are two independent structures.

The transceiver 403 is configured to perform an operation of receiving and sending a signal or data in the foregoing embodiments. The transceiver 403 includes an optical transmitter and/or an optical receiver. The optical transmitter may be configured to send an optical signal, and the optical receiver may be configured to receive an optical signal. The optical transmitter may be implemented through a light emitting device, such as a gas laser, a solid-state laser, a liquid laser, a semiconductor laser, or a directly modulated laser. The optical receiver may be implemented through an optical detector, such as a photodetector or a photodiode (such as an avalanche photodiode). The transceiver 403 may further include a digital-to-analog converter and an analog-to-digital converter. The transceiver 403 may further include a wavelength division multiplexer, configured to implement multiplexing and demultiplexing of optical signals of different wavelengths.

This embodiment of the present invention also has various beneficial effects described in the foregoing method embodiments. Details are not described herein again.

The present invention further provides a PON secure communication system, where the system includes the foregoing optical line terminal OLT 110 and one or more optical network units ONUs 130.

All or a part of the foregoing embodiments may be implemented by using software, hardware, firmware, or any combination thereof. When software is used to implement embodiments, all or a part of embodiments may be implemented in a form of a computer program product. The computer program product includes one or more computer instructions. When the computer program instructions are loaded and executed on a computer, the procedure or the functions according to embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

What is claimed is:

1. A method for secure communication, comprising:
using, by an optical line terminal (OLT), a random number as a private key of the OLT;
determining, by the OLT, a public key of the OLT based on a first key algorithm and the private key of the OLT;
sending, by the OLT, a first message to an optical network unit (ONU), wherein the first message comprises the first key algorithm, a certificate of the OLT, and the public key of the OLT, wherein the public key of the OLT and the private key of the OLT, and a public key and a private key corresponding to the certificate of the OLT are two sets of keys, and the first key algorithm is a key algorithm supported by both the OLT and the ONU;
receiving, by the OLT, a second message from the ONU, wherein the second message comprises a certificate of the ONU and a public key of the ONU, and the certificate of the ONU and the public key of the ONU are unencrypted; and
determining, by the OLT, a shared key based on the first key algorithm and the public key of the ONU after verification on the certificate of the ONU succeeds, wherein the shared key is used to encrypt a session between the OLT and the ONU.

2. The method according to claim 1, wherein before the sending, by an OLT, a first message, the method further comprises:
sending, by the OLT, an authentication request to the ONU;
receiving, by the OLT, a third message sent by the ONU, wherein the third message comprises a key algorithm supported by the ONU; and
determining, by the OLT, the first key algorithm based on the key algorithm supported by the ONU and a key algorithm supported by the OLT.

3. The method according to claim 1, wherein the first message further comprises a key parameter set, and the key parameter set comprises one or more key parameters that are used in determining the public key of the OLT.

4. The method according to claim 3, wherein the certificate of the OLT is preset on the OLT, or the OLT applies for a digital certificate from a certificate server in advance.

5. The method according to claim 3, wherein the determining, by the OLT, a shared key based on the first key algorithm and the public key of the ONU comprises:
determining, by the OLT, the shared key based on the first key algorithm, a second key parameter, the public key of the ONU, and a private key of the OLT, wherein the second key parameter belongs to the key parameter set.

6. The method according to claim 1, wherein the OLT uses the private key corresponding to the certificate of the OLT to digitally sign the first message.

7. The method according to claim 1, wherein the OLT sends the first message to the ONU after receiving a registration message of the ONU.

8. The method according to claim 2, wherein the first message, the second message, the third message, and the authentication request are transmitted through optical network terminal management and control interface (OMCI) messages.

9. The method according to claim 8, wherein the authentication request and the first message are OMCI set messages, and the second message and the third message are OMCI attribute value change (AVC) messages.

10. The method according to claim 8, wherein the first message, the second message, the third message, and the authentication request respectively correspond to different OMCI message types.

11. A method for secure communication, comprising:
receiving, by an optical network unit (ONU), a first message sent by an optical line terminal (OLT), wherein the first message comprises a first key algorithm, a certificate of the OLT, and a public key of the OLT, and the first key algorithm is a key algorithm supported by both the OLT and the ONU;
determining, by the ONU, a shared key based on the first key algorithm and the public key of the OLT after verification on the certificate of the OLT succeeds, wherein the shared key is used to encrypt a session between the OLT and the ONU;
using, by the ONU, a random number as a private key of the ONU; and
determining, by the ONU, a public key of the ONU based on the first key algorithm and the private key of the ONU; and
sending, by the ONU, a second message to the OLT, wherein the second message comprises a certificate of the ONU and the public key of the ONU, wherein the public key of the ONU and the private key of the ONU, and a public key and a private key corresponding to the certificate of the ONU are two sets of keys, the certificate of the ONU and the public key of the ONU are unencrypted, and the public key of the ONU is used to enable the OLT to determine the shared key.

12. The method according to claim 11, wherein the method further comprises:
receiving, by the ONU, an authentication request sent by the OLT; and
sending, by the ONU, a third message to the OLT, wherein the third message comprises a key algorithm supported by the ONU.

13. The method according to claim 11, wherein the first message further comprises a key parameter set, and the key parameter set comprises one or more key parameters that are used in determining the public key of the OLT.

14. The method according to claim 13, wherein the certificate of the ONU is preset on the ONU, or the ONU applies for a digital certificate from a certificate server in advance.

15. The method according to claim 13, wherein the determining, by the ONU, a shared key based on the first key algorithm and the public key of the OLT comprises:
determining, by the ONU, the shared key based on the first key algorithm, a second key parameter, the public key of the OLT, and a private key of the ONU, wherein the second key parameter belongs to the key parameter set.

16. The method according to claim 11, wherein the ONU uses the private key corresponding to the certificate of the ONU to digitally sign the second message.

17. The method according to claim 11, wherein the ONU receives the first message after sending a registration message to the OLT.

18. The method according to claim 12, wherein the first message, the second message, the third message, and the authentication request are transmitted through optical network terminal management and control interface (OMCI) messages.

19. The method according to claim 18, wherein the authentication request and the first message are OMCI set messages, and the second message and the third message are OMCI attribute value change (AVC) messages.

20. The method according to claim 18, wherein the first message, the second message, the third message, and the authentication request respectively correspond to different OMCI message types.

\* \* \* \* \*